United States Patent
Suzuki et al.

(10) Patent No.: US 11,172,151 B2
(45) Date of Patent: Nov. 9, 2021

(54) IMAGE CAPTURE APPARATUS AND METHOD FOR CONTROLLING THE SAME

(71) Applicant: CANON KABUSHIKI KAISHA, Tokyo (JP)

(72) Inventors: Satoshi Suzuki, Tokyo (JP); Nobuhiro Takeda, Yokohama (JP)

(73) Assignee: CANON KABUSHIKI KAISHA, Tokyo (JP)

( * ) Notice: Subject to any disclaimer, the term of this patent is extended or adjusted under 35 U.S.C. 154(b) by 0 days.

(21) Appl. No.: 16/778,604

(22) Filed: Jan. 31, 2020

(65) Prior Publication Data

US 2020/0252569 A1    Aug. 6, 2020

(30) Foreign Application Priority Data

Feb. 4, 2019 (JP) .............................. JP2019-018257

(51) Int. Cl.
*H04N 5/374* (2011.01)
*H04N 5/3745* (2011.01)
*H04N 5/369* (2011.01)
*H04N 5/235* (2006.01)
*H04N 5/341* (2011.01)

(52) U.S. Cl.
CPC ......... *H04N 5/3745* (2013.01); *H04N 5/2357* (2013.01); *H04N 5/341* (2013.01); *H04N 5/3696* (2013.01)

(58) Field of Classification Search
None
See application file for complete search history.

(56) References Cited

U.S. PATENT DOCUMENTS

| | | | |
|---|---|---|---|
| 9,887,218 B2* | 2/2018 | Ohmaru | H01L 27/14616 |
| 2007/0146501 A1* | 6/2007 | Matsuoka | H04N 5/235 |
| | | | 348/226.1 |
| 2010/0019128 A1* | 1/2010 | Itzler | H01L 27/14634 |
| | | | 250/208.1 |
| 2011/0174998 A1* | 7/2011 | Molnar | H01L 27/1446 |
| | | | 250/550 |
| 2013/0114073 A1* | 5/2013 | Namba | G01J 1/10 |
| | | | 356/226 |
| 2016/0241805 A1* | 8/2016 | Nishihara | H04N 5/35572 |

FOREIGN PATENT DOCUMENTS

JP        2012-174783 A     9/2012

* cited by examiner

*Primary Examiner* — James M Hannett
(74) *Attorney, Agent, or Firm* — Cowan, Liebowitz & Latman, P.C.

(57) ABSTRACT

An image capture apparatus comprising a plurality of pixels, each pixel having a light-receiving circuit that outputs a pulse signal in response to incidence of a photon and a counting circuit configured to count the pulse signal, is disclosed. The image capture apparatus further comprises a detection circuit that detects whether or not a flickering light source is present in a field of view, based on an output frequency of the pulse signal.

12 Claims, 13 Drawing Sheets

IMAGE CAPTURE APPARATUS AND METHOD FOR CONTROLLING THE SAME

BACKGROUND OF THE INVENTION

Field of the Invention

The present invention relates to an image capture apparatus and a method for controlling the same.

Description of the Related Art

A photodiode array has been proposed in which avalanche photodiodes (APD) to which a reverse bias voltage larger than a breakdown voltage is applied are arranged in an array, and the number of photons incident in a certain area is detected (Japanese Patent Laid-Open No. 2012-174783). It has also been proposed to use this photodiode array as a photon-counting image sensor.

Conventionally, regarding such a photon-counting image sensor, no method for detecting whether or not a flickering light source (a light source that flickers rapidly), such as fluorescent lighting or an LED, is present, or detecting characteristics of a flickering light source (or flickering light) has been proposed.

SUMMARY OF THE INVENTION

An aspect of the present invention provides an image capture apparatus capable of detecting whether or not a flickering light source is present using a photon-counting image sensor, and a method for controlling the same.

According to an aspect of the present invention, there is provided an image capture apparatus comprising: a pixel area in which pixels are two-dimensionally arranged, wherein each of the pixels has a light-receiving circuit that outputs a pulse signal in response to incidence of a photon and a counting circuit configured to count the pulse signal, and a detection circuit that detects whether or not a flickering light source is present in a field of view, based on an output frequency of the pulse signal.

According to another aspect of the present invention, there is provided an image capture apparatus comprising: a pixel area in which pixels are two-dimensionally arranged, wherein each of the pixels has a light-receiving circuit configured to output a pulse signal in response to incidence of a photon and a counting circuit configured to count the pulse signal; a memory that stores, for each of the pixels, an integrated value of a count value of the counting circuit; and a control circuit that controls whether or not to integrate the count value of the counting circuit, based on an output frequency of the pulse signal.

According to a further aspect of the present invention, there is provided a method for controlling an image capture apparatus that has a pixel area in which pixels are two-dimensionally arranged, wherein each of the pixels has a light-receiving circuit configured to output a pulse signal in response to incidence of a photon and a counting circuit configured to count the pulse signal, the method comprising: detecting whether or not a flickering light source is present in a field of view, based on an output frequency of the pulse signal.

According to another aspect of the present invention, there is provided a method for controlling an image capture apparatus that has: a pixel area in which pixels are two-dimensionally arranged, wherein each of the pixels has a light-receiving circuit configured to output a pulse signal in response to incidence of a photon, and a counting circuit configured to count the pulse signal; and a memory configured to store, for each of the pixels, an integrated value of a count value of the counting circuit, the method comprising: performing control regarding whether or not to integrate the count value of the counting circuit, based on an output frequency of the pulse signal.

Further features of the present invention will become apparent from the following description of exemplary embodiments with reference to the attached drawings.

DESCRIPTION OF THE EMBODIMENTS

Figure 1:
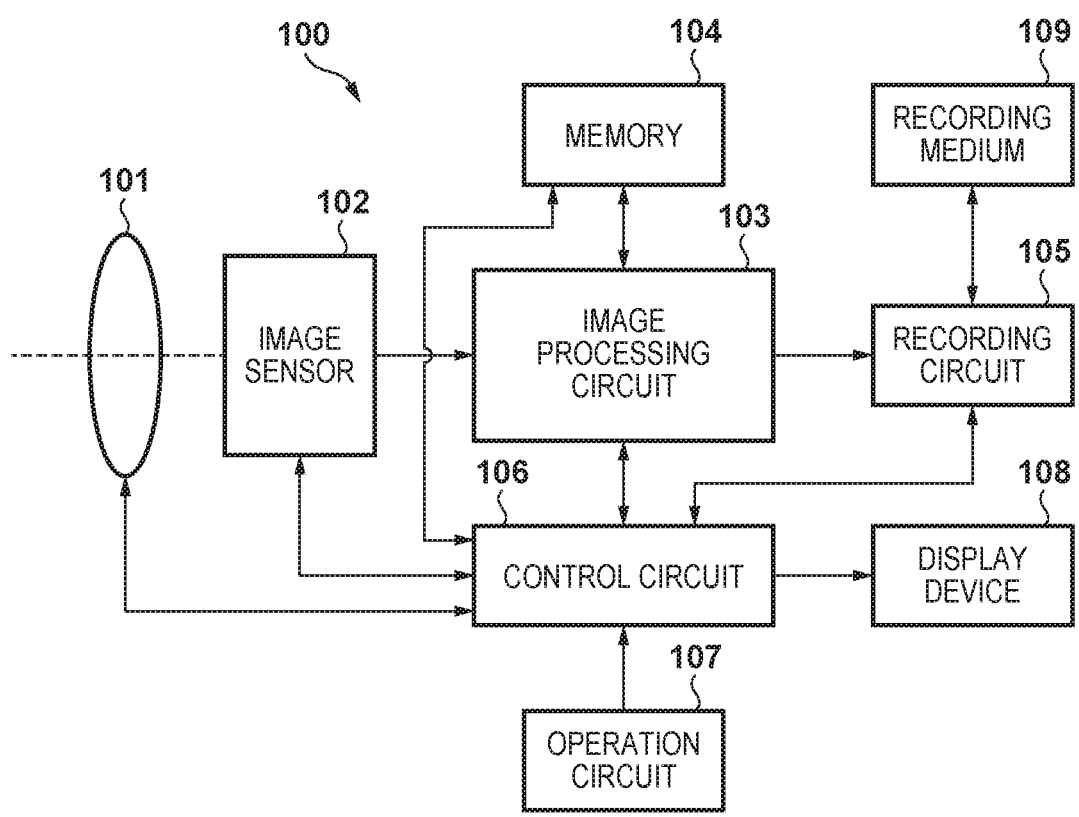
FIG. 1 shows an example configuration of an image capture apparatus according to embodiments.

Exemplary embodiments of the present invention will now be described in detail in accordance with the accompanying drawings. Note that the following embodiments do not limit the invention recited in the claims. Although a plurality of features are described in the embodiments, not all of the features are essential for the invention, and the plurality of features may be combined in any way. Furthermore, in the attached diagrams, the same or similar constituents are assigned the same reference numerals, and redundant descriptions are omitted.

First Embodiment

FIG. 1 is a block diagram showing an example functional configuration of a camera 100 that uses a photon-counting image sensor according to the first embodiment of the present invention.

A photographic lens 101 has a plurality of lenses including a focusing lens, a diaphragm, and/or an ND filter. The photographic lens 101 may be, but need not be removable. The photographic lens 101 is an imaging optical system that forms a subject optical image on an imaging plane of an image sensor 102. In the image sensor 102 (also called an imaging device) of a photo-counting type, pixels that have avalanche photodiodes (APD) as photoelectric transducers are two-dimensionally arranged. An example configuration of the image sensor 102 will be described later.

An image processing circuit 103 applies predetermined signal processing to image data that is read out from the image sensor 102, and generates image data that is to be displayed or recorded. Also, the image processing circuit 103 outputs information obtained by applying signal processing to image data to a control circuit 106. The image processing circuit 103 may be, for example, a dedicated hardware circuit such as an ASIC that is designed to realize a specific function, or may have a configuration in which a programmable processor such as a DSP realizes a specific function by executing software.

Here, signal processing applied by the image processing circuit 103 may include preprocessing, color interpolation processing, correction processing, detection processing, data processing, evaluation value calculation processing, and the like. Preprocessing may include signal amplification, reference level adjustment, defective pixel correction, and the like. Color interpolation processing is processing to interpolate a value of a color component that is not included in image data read out from pixels, and is also called demosaicing processing. Correction processing may include white balance adjustment, processing to correct image brightness, processing to correct optical aberrations of a lens group 10, processing to correct color, and the like. Detection processing may include processing to detect and track a feature region a face region or a human body region), person recognition processing, and the like. Data processing may include scaling processing, coding and encoding processing, header information generation processing, and the like. Evaluation value calculation processing is processing to calculate an evaluation value to be used in automatic exposure control processing and automatic focus detection processing performed by the control circuit 106. Note that these kinds of processing are examples of signal processing that can be performed by the image processing circuit 103, and do not limit signal processing to be performed by the image processing circuit 103.

A memory 104 is used as a buffer for image data, a work area for the image processing circuit 103 and the control circuit 106, and a video memory for a display device 108. A portion of the memory 104 is nonvolatile, and is used to store programs to be executed by the control circuit 106, set values thereof, set values of the camera 100, UI display data, and the like.

A recording circuit 105 writes and reads data files to and from a recording medium 109, which is a semiconductor memory card, for example, under the control of the control circuit 106.

The display device 108 is a flat panel display, for example, and displays images that are based on display signals supplied from the control circuit 106, such as a live view image and a menu screen. Note that the display device 108 may be a touch display.

An operation circuit 107 is an input device group that includes switches, buttons, a touch pad, a dial, and the like, and is used by a user to give instructions to the camera 100. Input devices included in the operation circuit 107 are assigned functions in a fixed or dynamic manner. Thus, the input devices function as a shutter button, a moving image record/stop button, a menu button, a direction key, a set button, an operation mode switching dial, and the like. Note that, if the display device 108 is a touch display, a software key that is realized by a combination of a touch panel and a GUI is included in the input device group that the operation circuit 107 has.

The control circuit 106 is a programmable processor, for example. The control circuit 106 loads programs stored in the nonvolatile memory provided in the memory 104 to a system memory in the memory 104 and executes the programs to control operations of each part and realize functionalities of the camera 100. For example, if an operation of the operation circuit 107 is detected, the control circuit 106 performs an operation corresponding to the detected operation.

Next, an example configuration of the image sensor 102 will be described with reference to FIG. 2. The image sensor 102 has a pixel area 200, a vertical selection circuit 202, a horizontal selection circuit 203, a timing generator (TG) 204, a pulse frequency detection circuit 205, a frame memory 206, an adder circuit 207, and a digital output circuit 208.

A plurality of pixels 201 are arranged in a matrix in the pixel area 200. Although only some of the pixels are shown here for simplification, several millions to tens of millions of pixels are arranged in an ordinary camera. Each of the pixels 201 can detect the amount of light incident on a light-receiving area thereof as the number of incident photons and output it as a digital value. If a count value of photons becomes greater than or equal to a predetermined threshold in a pixel 201, the pixel 201 outputs a pulse frequency detection signal PFREQ to the pulse frequency detection circuit 205 through an interconnect 212. Each interconnect 212 is connected to all of the pixels arranged in a corresponding pixel row and a pullup resistor 211, one end of which is connected to a power supply voltage VDD.

The pulse frequency detection circuit 205 is connected to all of the interconnects 212, and can count the number of pixels that have output the PFREQs in units of pixel rows. The pulse frequency detection circuit 205 detects a pixel row in which the ratio of pixels that have output the PFREQs during an exposure (counting) period has reached a predetermined value, and gives the TG 204 information indicating the detected pixel row.

Figure 2:
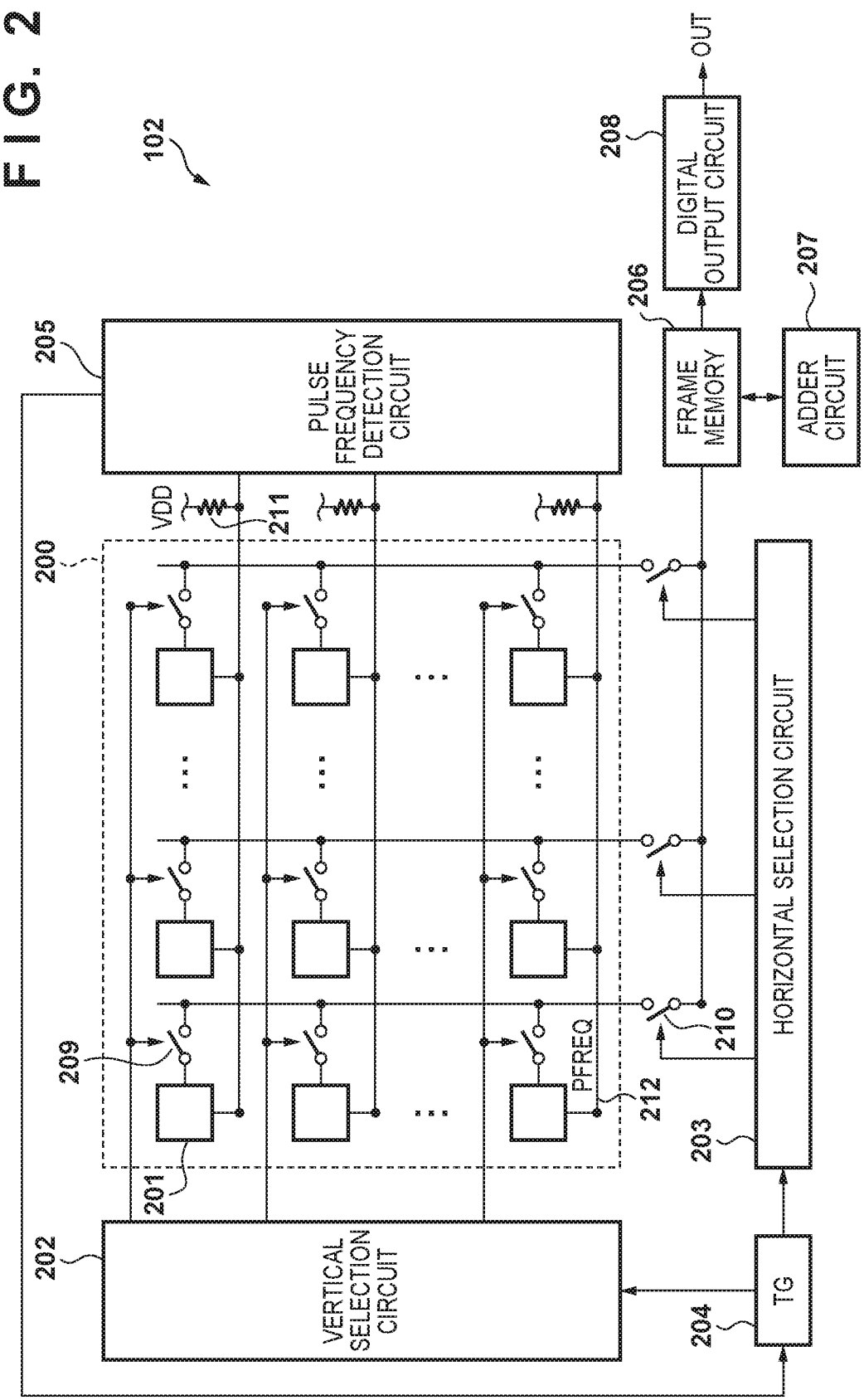
FIG. 2 shows an example configuration of an image sensor according to a first embodiment.

Although, the PFREQs are counted for each pixel row in the example configuration shown in FIG. 2, the PFREQs may be counted using other units. For example, the PFREGs may be counted for each pixel column, or the PFREGs of all of the pixels may be counted at a time, or the PFREGs may be counted for each predetermined two-dimensional area.

The TG 204 outputs a timing signal for controlling operations to the vertical selection circuit 202, the horizontal selection circuit 203, the frame memory 206, the adder circuit 207, and the digital output circuit 208 (FIG. 2 partially omits the interconnects). Operations of the TG 204 are controlled by the control circuit 106.

The vertical selection circuit 202 selects pixels 201 arranged in the pixel area 200 by pixel row by controlling on and off of switches 209. Also, the vertical selection circuit 202 sends a control signal to each of the pixel rows via an interconnect (not shown) (described later).

The horizontal selection circuit 203 selects pixels 201 arranged in the pixel area 200 by pixel column by controlling on and off of switches 210. Image data (count value of photons) is read out from a pixel selected by both the vertical selection circuit 202 and the horizontal selection circuit 203, and is input to the frame memory 206.

The frame memory 206 holds image data read out from the pixels 201. The frame memory 206 has a temporary memory area and an integration memory area. The temporary memory area is an area for temporarily holding image data. The integration memory area is an area for integrating, for each address, image data held in the temporary memory area during an exposure period, and holding the integrated image data. The number of bits per pixel in the temporary memory area is equal to the number of bits of image data (the number of bits of a counter provided in the pixel). Meanwhile, the number of bits per pixel in the integration memory area is greater than the number of bits of image data, and is a sufficient number of bits for storing an integrated value.

The adder circuit 207 performs addition processing to integrate image data held in the temporary memory area in the frame memory 206 into the integration memory area. Specifically, the adder circuit 207 reads out an image signal held in the integration memory area and image data held in the temporary memory area corresponding to the same pixel, adds the read image signal and image data, and writes the addition result back to the integration memory area.

The digital output circuit 208 reads out image data held in the integration memory area in the frame memory 206 in a predetermined order, and outputs the read image data to the image processing circuit 103. Note that the frame memory 206 and the adder circuit 207 may be provided outside the image sensor 102. In this case, a configuration is employed in which image data read out from pixels is output from the digital output circuit 208 and is held in the temporary memory area in the frame memory 206 that is provided externally.

Figure 3:
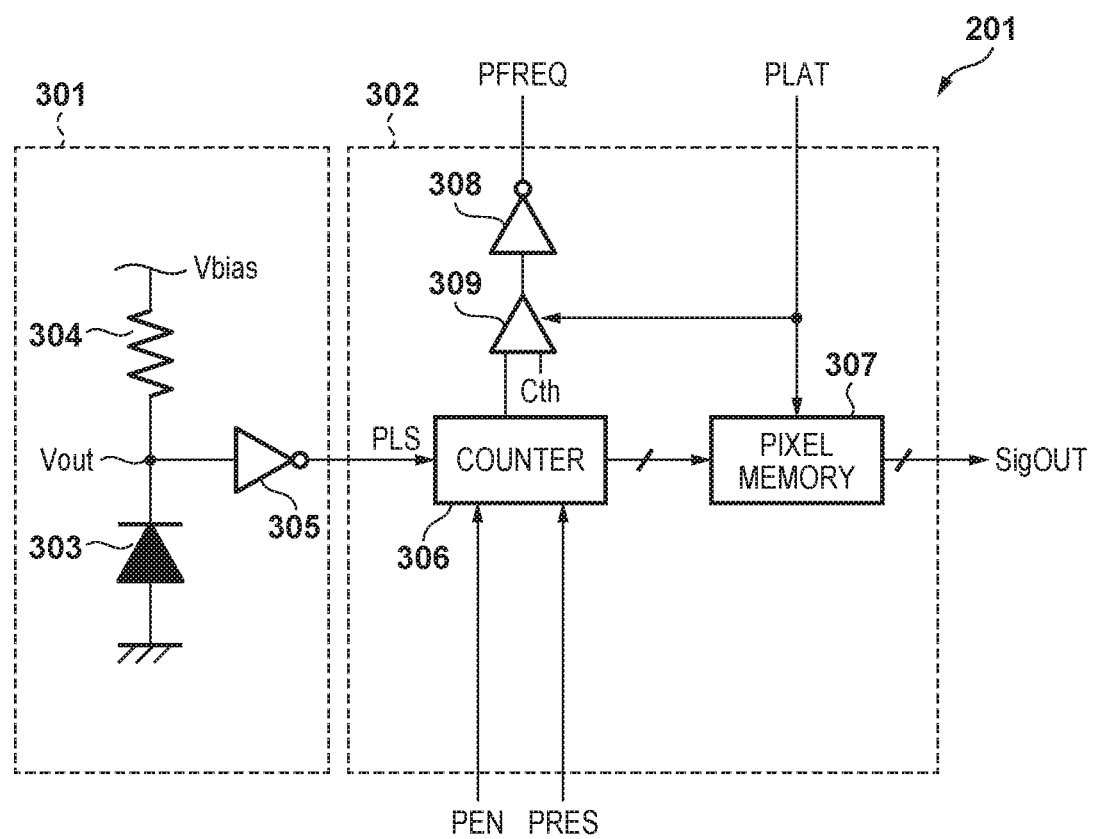
FIG. 3 shows an example circuit configuration of the image sensor according to the first embodiment.

FIG. 3 shows a more specific example configuration of a pixel 201. The pixel 201 includes a light-receiving circuit 301 and a counting circuit 302. The light-receiving circuit 301 has a photodiode 303, a quenching resistor 304, and an inverting buffer 305. The photodiode 303 is an avalanche photodiode (APD). A bias voltage Vbias that is larger than or equal to a breakdown voltage is applied to the photodiode 303 via the quenching resistor 304. Thus, the photodiode 303 operates in a Geiger mode, and an avalanche multiplication phenomenon occurs if a photon is incident thereon.

If an avalanche multiplication phenomenon occurs, an avalanche current is generated to cause a voltage drop in the quenching resistor 304, and the bias voltage applied to the photodiode 303 is lowered. If the bias voltage falls below the breakdown voltage of the photodiode 303, the avalanche multiplication phenomenon stops. As a result, the avalanche current no longer flows, and the bias voltage Vbias that is larger than or equal to the breakdown voltage is again applied to the photodiode 303. Thus, the quenching resistor 304 is used to stop the avalanche multiplication phenomenon in the photodiode 303. Note that a resistance component of the transistor may be used as the quenching resistor 304.

A voltage change occurring at a node Vout between the quenching resistor 304 and the photodiode 303 due to the occurrence of the avalanche multiplication phenomenon is converted to a pulse signal by the inverting buffer 305. Accordingly, if a photon is incident on the photodiode 303 that operates in the Geiger mode, a pulse signal PLS is output from the inverting buffer 305 and is supplied to the counting circuit 302.

The counting circuit 302 has a counter 306 that is connected to the inverting buffer 305, a pixel memory 307 for holding a count value of the counting circuit 306, a comparator 309, and an inverting buffer 308.

The counter 306 is supplied with the pulse signal PLS from the light-receiving circuit 301, and an enable signal PEN and a reset signal PRES from the vertical selection circuit 202. The counter 306 counts the number of times that the PLS has changed from the L (low) level to the H (high) level, in a state where the PEN is at the H level and the PRES is at the L level. If the PEN is at the L level, the counter 306 does not change the count value. If the PRES switches to the H level, the counter 306 resets the count value to an initial value (e.g. 0).

The pixel memory 307 receives a supply of a latch signal PLAT from the vertical selection circuit 202. If the PLAT switches from the L level to the H level, the pixel memory 307 holds the count value of the counter 306 at this point in time as image data.

Image data held in the pixel memory 307 in a pixel 201 selected by both the vertical selection circuit 202 and the horizontal selection circuit 203 is held in the temporary memory area of the frame memory 206 via a vertical signal line and a switch 210. Note that, in this embodiment, the same PEN, PRES, and PLAT are supplied to all of the pixels 201 arranged in the pixel area 200.

The comparator 309 compares the count value of the counter 306 when the PLAT switches from the L level to the H level with a predetermined threshold Cth, and outputs a level that indicates the comparison result. Specifically, the H level is output if the count value is greater than or equal to the threshold, and the L level is output if the count value is smaller than the threshold. The output of the comparator 309 is output as the PFREQ through the inverting buffer 308 of an open-drain output type. Accordingly, if the count value of the counter 306 is smaller than the threshold Cth, the output of the inverting buffer 308, i.e. the PFREQ is in a high impedance state (H level). On the other hand, if the count value of the counter 306 is greater than or equal to the threshold Cth, the PFREQ is at the L level. Although the details will be described later, the threshold Cth is used to detect a state where the amount of light incident per predetermined unit period (or unit time) is large (a state where the output frequency of the pulse signal is high), and is set by the control circuit 106 or the pulse frequency detection circuit 205. The PFREQ can also be considered as a signal at a level corresponding to the output frequency of the pulse signal.

As has been described regarding FIG. 2, the PFREQs from the pixels 201 arranged in the same pixel row are output to a common interconnect 212, which is pulled up by the pullup resistor 211. Accordingly, the level of the interconnect 212 indicates the logical sum of the PFREQs from the pixels 201 connected thereto. That is to say, if the count values at all of the pixels in a certain pixel row are smaller than the threshold Cth, the PFREQ input to the pulse frequency detection circuit 205 via the interconnect 212 is at the H level. On the other hand, if the count value at any of the pixels in a row is greater than or equal to the threshold Cth, the PFREQ switches to the L level.

The pulse frequency detection circuit 205 receives the input of the PFREQs from all of the pixel rows. For this reason, the pulse frequency detection circuit 205 can detect, based on the levels of the PFREQs, whether or not any pixel with a count value that is greater than or equal to the threshold Cth is present in the pixel area 200, and can detect the positions and the total number of pixel rows in which pixels with a count value that is greater than or equal to the threshold Cth are present.

Also, based on the period in which the level of a PFREQ changes and a periodic change over time in the subject brightness, the pulse frequency detection circuit 205 and the control circuit 106 can detect whether or not flicker noise or a flickering light source is present, as well as brightness change characteristics (e.g. period or frequency) of the flickering light. For example, if variations in the period (or frequency) in which the level of a PFREQ changes are within a predetermined range, the pulse frequency detection circuit 205 can determine that a flickering light source is present. This operation of the pulse frequency detection circuit 205 corresponds to an operation to detect whether or not flickering light (or a flickering light source) is present in a field of view, and characteristics thereof, based on the output frequency of the pulse signal or a change over time in the output frequency. Also, if variations in the period (or frequency) in which the brightness of the same subject area changes over time are within a predetermined range, the control circuit 106 can determine that a flickering light source is present. Also, the pulse frequency detection circuit 205 and/or the control circuit 106 can determine the threshold Cth based on change characteristics of flickering light or the subject brightness.

Figure 4:
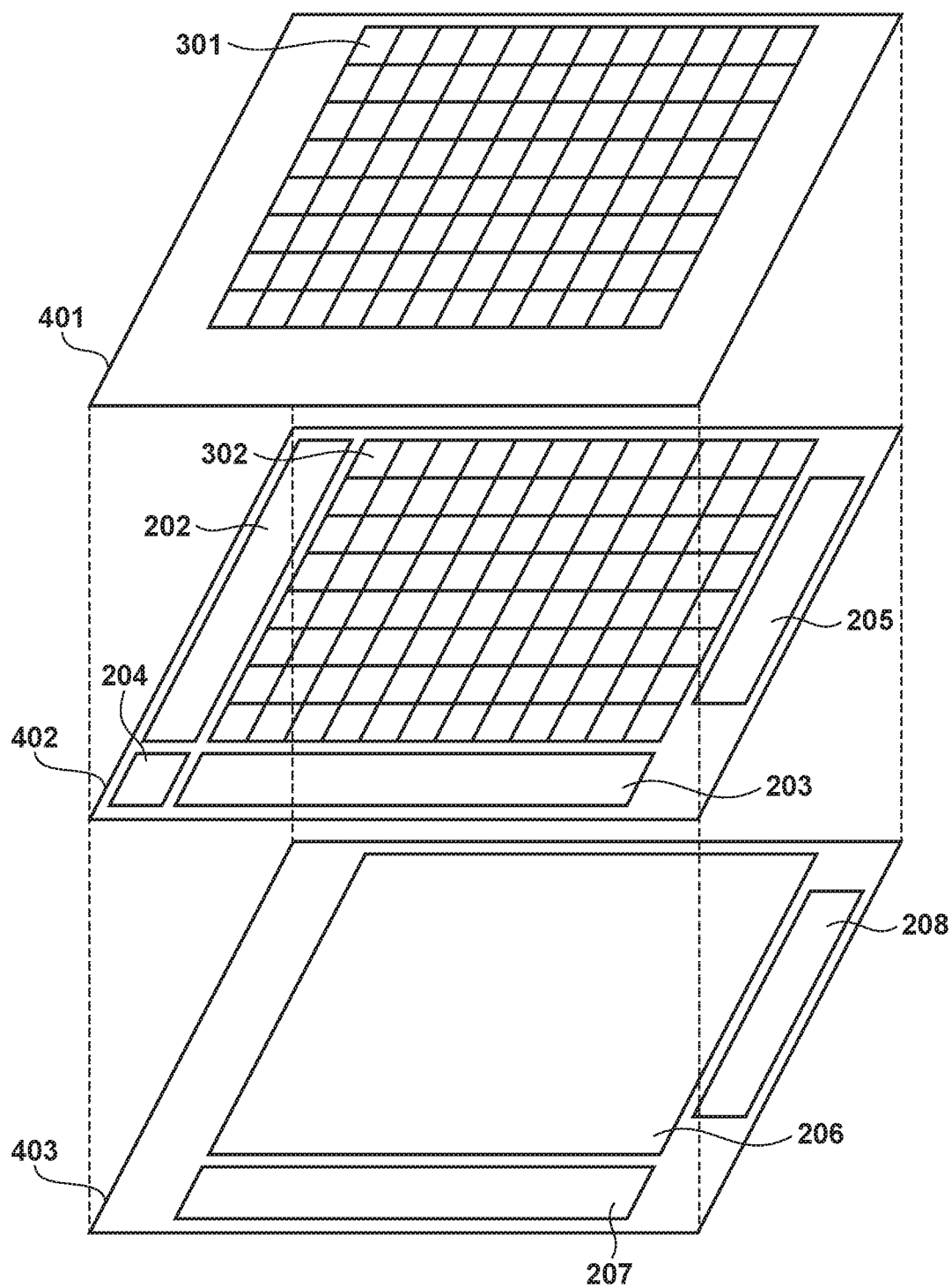
FIG. 4 shows an example of a chip layout of the image sensor according to the first embodiment.

FIG. 4 is a perspective view schematically showing an example of a chip layout of the image sensor 102.

The image sensor 102 has a configuration in which a light-receiving circuit substrate 401, a counting circuit substrate 402, and a frame memory substrate 403 are stacked. The substrates are electrically connected to each other using silicon through electrodes or the like. In the light-receiving circuit substrate 401, the light-receiving circuits 301 in the pixels 201 in the pixel area 200 are arranged in a matrix. In the counting circuit substrate 402, the counting circuits 302 in the pixels 201 are arranged in a matrix. Also, in the counting circuit substrate 402, the vertical selection circuit 202, the horizontal selection circuit 203, the TG 204, and the pulse frequency detection circuit 205 are arranged. In the frame memory substrate 403, the frame memory 206, the adder circuit 207, and the digital output circuit 208 are arranged.

The light-receiving area in each pixel 201 can be increased by forming the light-receiving circuit 301 and the counting circuit 302 thereof on separate substrates. In addition, if the frame memory substrate 403 is manufactured by a finer process than the light-receiving circuit substrate 401 and the counting circuit substrate 402, the capacity of the frame memory 206 can be increased. Note that, instead of employing the stacked structure shown in FIG. 4, all of the circuits in the image sensor 102 may be formed on the same substrate.

Figure 5:
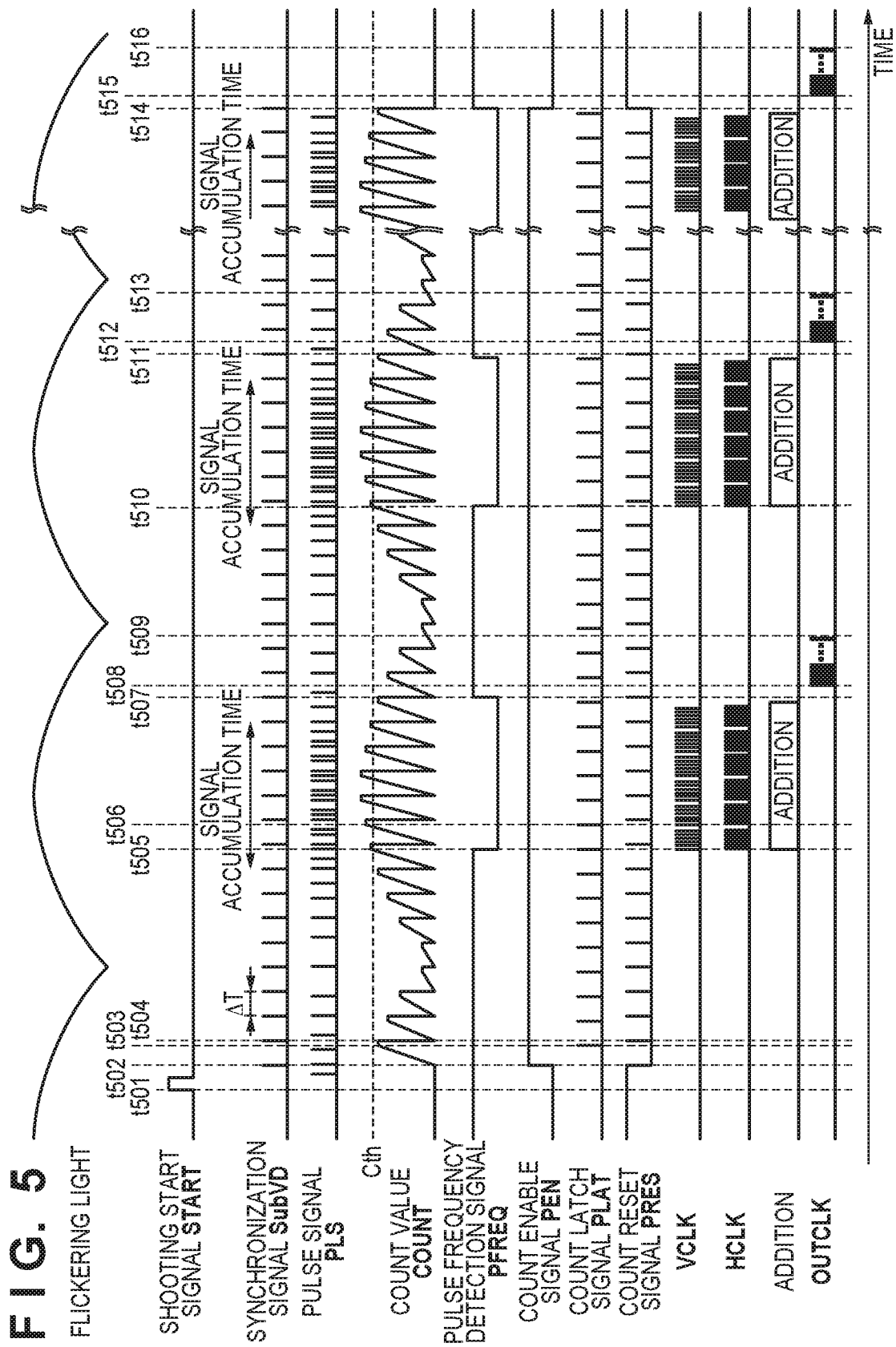
FIG. 5 is a timing chart relating to an operation of the image sensor according to the first embodiment.

Next, a description will be given, with reference to the timing chart in FIG. 5, of an operation to read out the image sensor 102 performed when image data for a plurality of frames is continuously acquired, as in the case of shooting a moving image. It is assumed here that ambient light is flickering light that has brightness change characteristics shown in the uppermost part of FIG. 5. It is assumed that the brightness change characteristics of flickering light has been detected by the pulse frequency detection circuit 205 or the control circuit 106, based on moving image data that is obtained in order to allow the display device 108 to function as an EVF in a shooting-standby state, for example. Note that FIG. 5 shows the pulse signal PLS, the count value COUNT, and the pulse brightness detection signal PFREQ of one of the plurality of pixels provided in the pixel area 200 (hereinafter referred to as a representative pixel).

For example, upon a shooting start signal START switching to the H level at time t501 in accordance with an input made through the operation circuit 107, the control circuit 106 starts supplying the bias voltage Vbias to each pixel 201 in the image sensor 102. Accordingly, the photodiode 303 in the light-receiving circuit 301 starts operating in the Geiger mode, and the PLS signal is output from the light-receiving circuit 301 every time a photon is incident on the photodiode 303. Note that, since the PRES is at the H level at time t501, the count value of the counter 306 has been reset to 0 in all of the pixels 201. Accordingly, the PFREQ is at the H level.

At time t502, the PRES switches to the L level, and the reset of the counter 306 in each pixel 201 is released. Also, the PEN switches to the H level, and the counter 306 in each pixel 201 enters an enabled state. Thus, an exposure period starts, and the counter 306 in each pixel 201 starts counting the number of times that the PLS switches from L level to the H level.

Also, from time t502, a synchronization signal SubVD switches to the H level at every predetermined interval Δt. In this embodiment, the interval (period) at which the SubVD switches to the H level is regarded as a unit period (or a unit time), and the output frequency of the pulse signal PLS per unit period is calculated based on the count value of the counter 306. The unit period Δt can be set as a period that is shorter than or equal to the shortest time that can be set as signal accumulation time (exposure time or shutter speed). Also, the unit period Δt may be set by adding, regarding the brightness of a predetermined subject, a condition that the count value of a counting circuit in a pixel per unit period Δt does not exceed a predetermined value (<threshold Cth).

The count value COUNT indicates a change in the count value of the counter 306 in one pixel 201 in the pixel area 200. At time t503 after a predetermined period from when the SubVD switched to the H level at time t502, the latch signal PLAT switches to the H level. The count value of the counter 306 at the point in time when the latch signal PLAT switches to the H level is held as image data in the pixel memory 307, and is compared with the threshold Cth by the comparator 309. In the pixel whose count value is shown in FIG. 5, the count value of the counter 306 at time t503 is smaller than the threshold Cth, and accordingly the PFREQ remains at the H level and does not change.

As mentioned above, the pulse frequency detection circuit 205 can detect, based on the level of the PFREQ, whether or not a pixel with a count value that becomes greater than or equal to the threshold Cth is present in the pixel area 200. A pixel with a count value that becomes greater than or equal to the threshold Cth during a unit period is a pixel on which a large amount of light is incident.

In this embodiment, if there is any pixel with a count value that becomes greater than or equal to the threshold Cth (i.e. there is any pixel row in which the PFREQ is at the L level) during a unit period, the pulse frequency detection circuit 205 determines that a high-brightness light source is present in the field of view. Then, the pulse frequency detection circuit 205 gives the TG 204 an instruction to output a VCLK and an HCLK, which are control signals for reading out a count value held in the pixel memory 307 and having the read count value held in the frame memory 206. For example, this instruction may be transmission of specific information from the pulse frequency detection circuit 205 to the TG 204.

In the example shown in FIG. 5, at time t503, the PFREQ remains at the H level and has not changed in all of the pixels. This corresponds to the fact that no pixel with a count value of the counter 306 that becomes greater than or equal to the predetermined threshold Cal is present in the pixel area 200. In this case, the pulse frequency detection circuit 205 determines that no high-brightness light source is present in the field of view, and does not cause the TG 204 to output the control signals VCLK and HCLK. Accordingly, the count value held in the pixel memory 307 is not read out to the frame memory 206.

At time t504, the PRES switches to the H level, and the count value of the counter 306 in each pixel 201 is reset to 0. Immediately thereafter, the SubVD switches to the H level and the PRES simultaneously returns to the L level, thus the reset of the counter 306 is released, and the counter 306 in each pixel 201 starts counting the PLS for the next unit period.

After a plurality of unit periods in which no pixel with a count value of the counter 306 that is greater than or equal to the threshold Cth is present have elapsed since time t504, upon a pixel with a count value COUNT that is greater than or equal to the threshold Cth occurring firstly at time t505, the PFREQ switches to the L level. It is assumed here that the count value COUNT of the pixel whose count value COUNT is shown in FIG. 5, of all of the pixels, exceeds the threshold Cth.

Upon detecting that the PFREQ has switched to the L level, the pulse frequency detection circuit 205 gives the TG 204 an instruction to output the VCLK and the HCLK. Thus, from time t505, the VCLK is supplied from the TG 204 to the vertical selection circuit 202. Every time the VCLK switches to the H level, the switches 209 in each row sequentially turn on, and the vertical selection circuit 202 selects pixels in the pixel area 200 row-by-row. Then, with one row selected, the HCLK is supplied from the TG 204 to the horizontal selection circuit 203, and the switches 210 in each column are sequentially turn on. As a result, the count values held in the pixel memories 307 in the pixels in the selected row are sequentially read out and are held in the temporary memory area of the frame memory 206.

If the PFREQ switches from the H level to the L level at certain time, the start time of a unit time that includes this time (more strictly, the time when the PRES returned to the L level) serves as the start time of signal accumulation time. Accordingly, if the PFREQ switches to the L level at time t505, the signal accumulation time starts from the start time of the unit period that includes time t505. In this embodiment, the signal accumulation time is an integral multiple of the unit period, and corresponds to an exposure time or shutter speed that is predetermined by a user or automatic exposure control processing, for example.

Then, the adder circuit 207 adds, for each address, the count value newly held in the temporary memory area and the count value held in the integration memory area in the frame memory 206, and again has the added count value held in the integration memory area. Note that this addition processing is performed in parallel with processing to hold the read count value in the temporary memory area in the frame memory 206.

Note that, when first addition processing performed from time t505 to time t506 is performed, no count value is held in the integration memory area in the frame memory 206. For this reason, the count value read out from the pixels may be directly held in the integration memory area, rather than having these count values held in the temporary memory area.

The count value of the counter 306 is read out through the pixel memory 307 every unit period in which the PFREQ is at the L level. Then, the count values are sequentially integrated for each pixel in the integration memory area in the frame memory 206. The pulse frequency detection circuit 205 determines whether or not the total of the unit periods in which the count values were read out has reached the signal accumulation time. If it is determined that the total of the unit periods in which the count values were read out has reached the signal accumulation time, the pulse frequency detection circuit 205 reads out image data from the integration memory area in the frame memory 206 regardless of the level of the PFREQ. Specifically, the pulse frequency detection circuit 205 causes the TG 204 to stop supplying the VCLK to the vertical selection circuit 202 and the HCLK to the horizontal selection circuit 203, and causes the TG 204 to start supplying the OUTCLK to the digital output circuit 208. Note that the PEN maintains the H level. Thus, the enabled state of the counter 306 in each pixel is maintained.

Note that FIG. 5 shows the case where periods in which the PFREQ is at the L level are periods corresponding to the signal accumulation time. In this case, the operation to read out the integrated count value (image data) starts at time t508 immediately after the PFREQ has switched to the H level. However, even if the PFREQ maintains the L level even after the signal accumulation time has elapsed, the operation to read out image data (supply of the OUTCLK) starts from time t508. Upon the readout being completed at time t509, image data held in the integration memory area in the frame memory 206 is reset to 0.

Thus, regarding a plurality of pixels arranged in the pixel area 200, the count values are integrated for each pixel during a unit period in which the count value exceeds the threshold Cth in at least one pixel. Upon the unit periods in which the count values are integrated reaching the signal accumulation time, the integrated count value is read out as a pixel value.

Thereafter, upon the COUNT of the representative pixel reaching the threshold Cth at time t510, the PFREQ of the representative pixel again switches to the L level, and image data for the next frame begins to be acquired. The VCLK and the HCLK are output from the TG 204 similarly to those output when image data for the first frame is acquired from time t505 to time t507, and the count value is transferred from the pixel memory 307 to the frame memory 206 and integration (addition) processing is performed.

Upon the total of the unit periods in which the count values were read out reaching the signal accumulation time at time t511, the operation to read out the integration memory area in the frame memory 206 starts from time t512.

Thereafter, frame image data is similarly acquired repeatedly until a signal for stopping or ending moving image shooting is detected. At time t514, upon the signal accumulation time for the last frame elapsing, the PEN switches to the L level. Thus, the counter 306 in each pixel enters a disabled state, and the PLS input to the counter is no longer counted. The supply of the bias voltage Vbias to the light-receiving circuit 301 may also be stopped such that the light-receiving circuit 301 does not output the PLS Then, the PRES switches to the H level, and the count value of the counter 306 is reset to 0. Here, the PFREQ also switches to the H level, and the control signal is no longer sent from the pulse frequency detection circuit 205 to the TG 204. Thereafter, readout processing is performed from time t515 to time t516, and image data for the last frame is output.

Thus, the count values are integrated for each pixel during unit periods in which the count value of the counter 306 in one or more pixels, of the plurality of pixels arranged in the pixel area 200, becomes greater than or equal to the predetermined threshold. If the total of the unit periods in which the count values are integrated reaches the signal accumulation time, the integrated count value is read out as image data for one frame. For this reason, even in the case where, for example, a subject that is illuminated by a flickering light source or flickering light is shot, a signal in periods in which the brightness of flickering light is greater than or equal to a certain value can be obtained. Thus, an image can be acquired while suppressing the influence of flickering light.

Accordingly, even if the signal accumulation time (exposure time or shutter speed) is shorter than a brightness change period of flickering light, an image can be acquired while suppressing the influence of the change in the brightness of flickering light. This configuration is particularly advantageous since a difference in the brightness between images can be suppressed during moving image shooting and continuous shooting.

Note that, in the example in FIG. 5, the time required to output image data for one frame from the frame memory 206 via the digital output circuit 208 is sufficiently shorter than the period of flickering light, and image data can be acquired every flickering period. However, if the time required to output image data is longer than the period of flickering light, a configuration may be employed in which the count values are integrated such that the signal accumulation time spans over a plurality of flickering periods to ensure the time required to output image data. This operation will be described later with reference to FIG. 7.

The readout operation shown in FIG. 5 is not limited to being performed during moving image shooting and continuous shooting, and can also be carried out in a single shooting mode. In the case of shooting in the single shooting mode, processing similar to that at time t514 may be performed at time t508.

Figure 6:
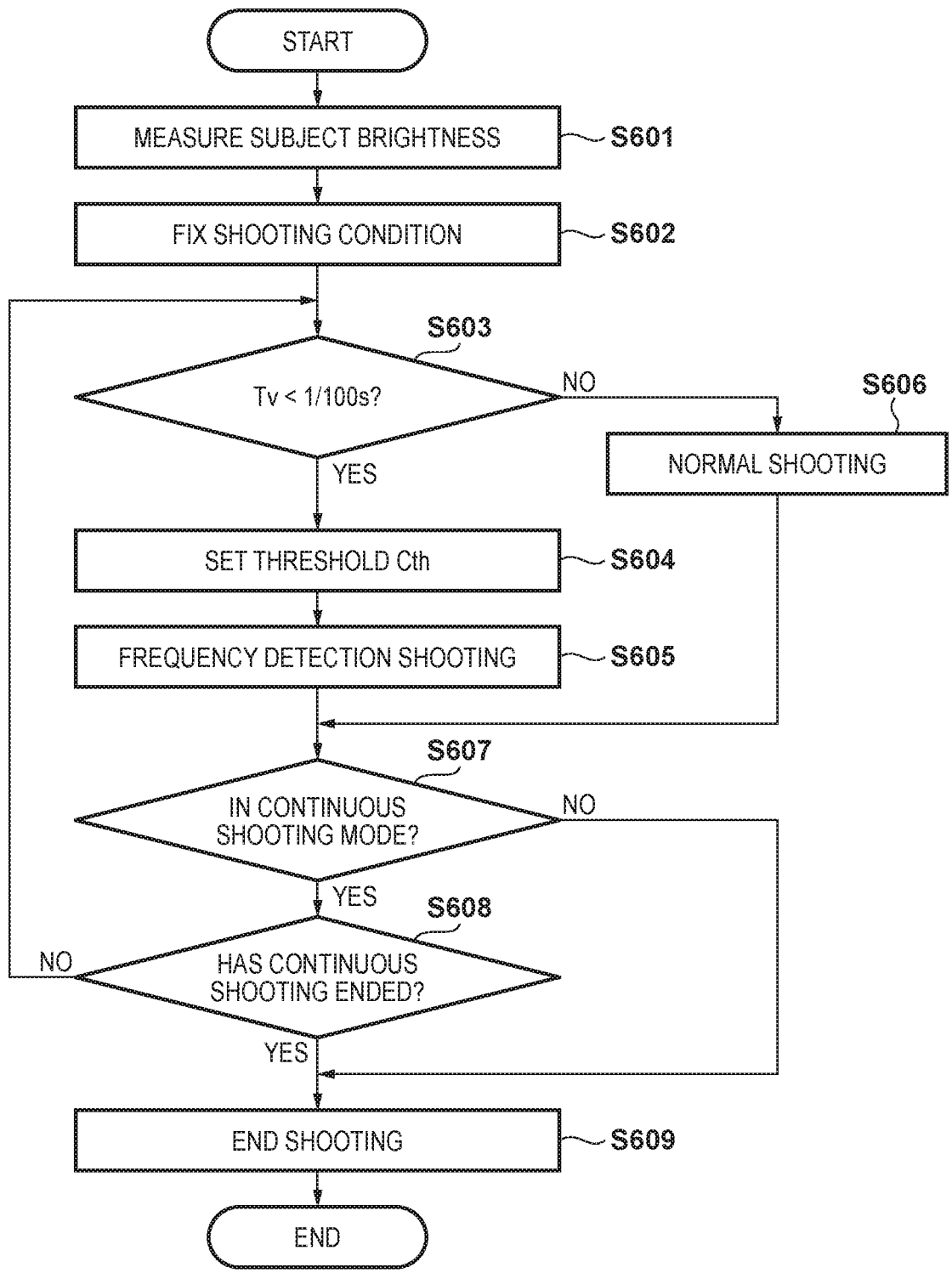
FIG. 6 is a flowchart of a shooting sequence according to the embodiment.

Next, a shooting operation of the camera 100 according to this embodiment will be described with reference to the flowchart in FIG. 6.

In step S601, the control circuit 106 measures the subject brightness. The subject brightness may be acquired using a moving image for a live view display that is shot during shooting standby, or may be acquired using a dedicated photometric sensor. Also, any kind of brightness information may be obtained as the subject brightness. For example, the subject brightness may be an average brightness and/or the maximum brightness of the entire subject and/or a specific area. A brightness evaluation value to be used in automatic exposure control (AE) may be used as the subject brightness. Considering the possibility that flickering light is present, the subject brightness in a plurality of frames or a predetermined period may be measured over time. If a periodic change in the subject brightness over time is recognized, the control circuit 106 may determine that flickering light is present and detect brightness change characteristics of the flickering light.

In step S602, the control circuit 106 determines shooting conditions (sensitivity, aperture, signal accumulation time (shutter speed) etc.) based on the subject brightness measured in step S601, user settings, and the like. This may be known automatic exposure control processing.

In step S603, the control circuit 106 determines whether or not the signal accumulation time, of the shooting conditions determined in step S602, is shorter than predetermined time (which is $1/100$ seconds as an example here). The control circuit 106 advances the processing to step S604 if it is determined that the signal accumulation time is shorter than the predetermined time, and advances the processing to step S606 if not. The predetermined time used here may be a value that differs depending on the shooting mode or the like. For example, the period in which the brightness of a light source that is envisioned as flickering light changes may be used as the predetermined time.

In step S604, the control circuit 106 determines the threshold Cth based on the subject brightness measured in step S601, and sets the threshold Cth for each pixel. For example, the control circuit 106 can determine, as the threshold Cth, the count value corresponding to a brightness value that is smaller than the largest value of the subject brightness measured over time by a predetermined ratio. Note that the threshold Cth can be determined as a threshold for determining whether or not there is any area with a high brightness, using any method.

In step S605, the control circuit 106 detects the shooting start signal START, and starts the accumulation and readout operation described with reference to FIG. 5.

On the other hand, in step S606, the control circuit 106 does not perform the signal readout operation described with reference to FIG. 5, but starts the conventional accumulation and readout operations. The conventional accumulation and readout operation may be an operation to start counting the pulse signal PLS upon the shooting start signal START being detected, and read out, as image data, the count value at each pixel when the signal accumulation time has elapsed.

Upon image data for one frame being acquired in step S605 or S606, in step S607, the control circuit 106 determines whether or not the shooting mode is that performs shooting continuously (i.e., such as continuous shooting mode or moving image shooting mode). The control circuit 106 advances the processing to step S608 if it is determined, that the shooting mode is a continuous shooting mode, and advances the processing to step S609 if not (if the shooting mode is a single shooting mode).

In step S608, the control circuit 106 determines whether or not an end condition for continuous shooting is met. The end condition may be, for example, detection of an instruction to end continuous shooting, detection of expiration of the instruction to continue continuous shooting, or the like. The processing is advanced to step S609 if it is determined that the end condition for continuous shooting is met, and the processing returns to step S603 if not.

In step S609, the control circuit 106 ends the accumulation and readout operation.

Note that, as mentioned above, the threshold Cth in step S604 can also be determined based on a change in the pulse frequency over time. For example, a configuration may be employed in which the pulse frequency (count value) is obtained over a plurality of unit periods in FIG. 5, a brightness component of flickering light is measured based on the change in the pulse frequency over time, and the threshold Cth is determined based on the brightness value from which the brightness component of flickering light is removed. Also, if a periodic change in the pulse frequency (count value) over time is recognized, the control circuit 106 (or the pulse frequency detection circuit 205) may determine that flickering light is present and detect brightness change characteristics of the flickering light.

As described above, according to this embodiment, the count values are integrated for each pixel in the unit periods in which the count value of one or more pixels, of the plurality of pixels arranged in the pixel area of the photocounting image sensor, becomes greater than or equal to the predetermined threshold. If the total of the unit periods in which the count values are integrated reaches the signal accumulation time, the integrated count value is read out as image data for one frame. For this reason, even in the case where, for example, a subject that is illuminated by a flickering light source or flickering light is shot, a signal in periods in which the brightness of flickering light is greater than or equal to a certain value can be obtained. Accordingly, an image can be acquired while suppressing the influence of flickering light.

Another Mode of First Embodiment

Figure 7:
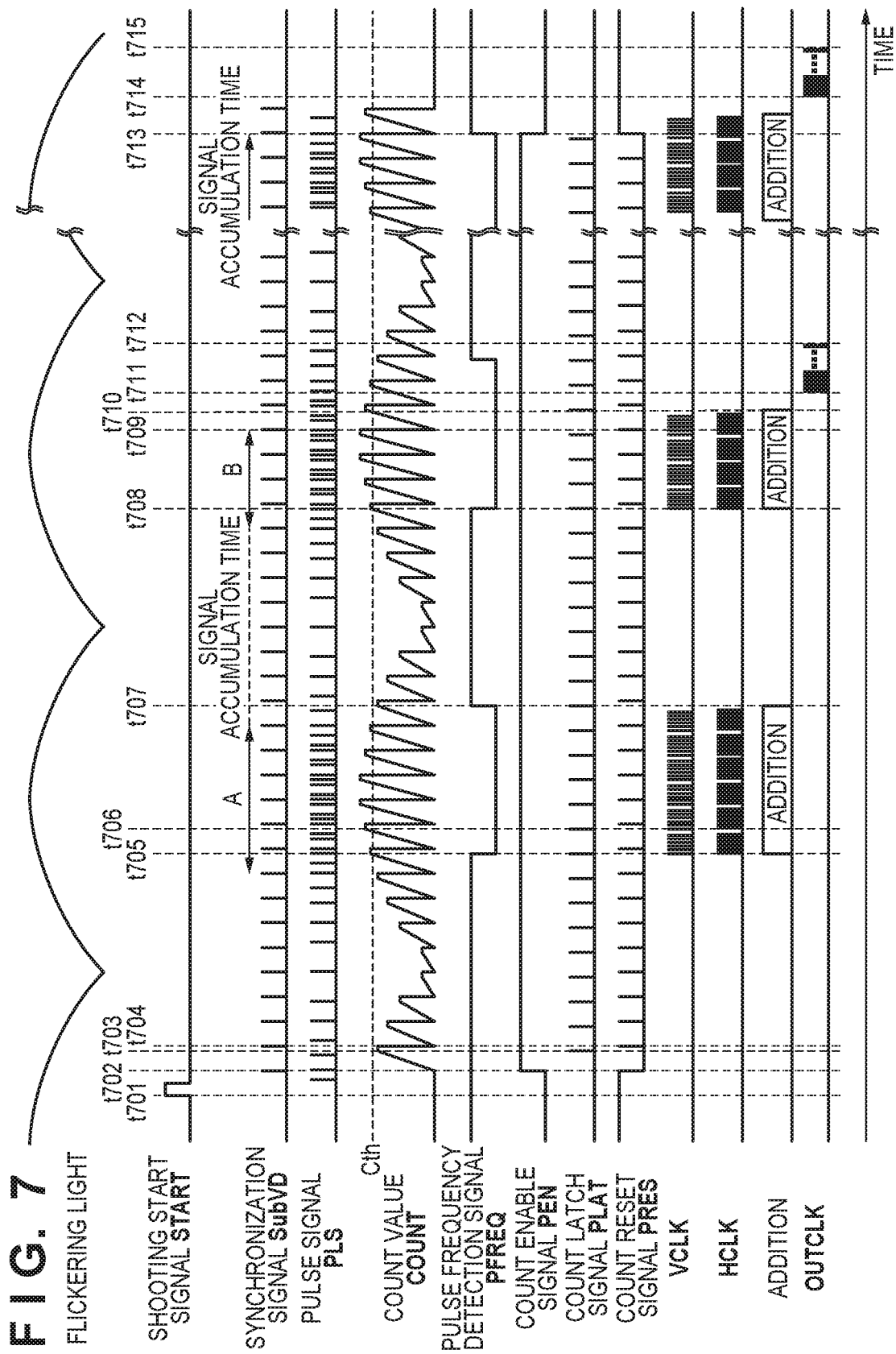
FIG. 7 is a timing chart relating to an operation of the image sensor according to another mode of the first embodiment.

As mentioned above, the timing chart in FIG. 5 shows an operation in the case where the signal accumulation time is shorter than the brightness change period of flickering light. FIG. 7 shows a timing chart relating to a signal accumulation and readout operation in the case where the signal accumulation time is longer than the brightness change period of flickering light. For example, this operation can be performed in place of the conventional accumulation and readout operation in step S606 in FIG. 6.

Note that the following description focuses on differences from the operation described with reference to FIG. 5, and common operations are described briefly.

Operations from time t701 to time t707 are the same as the operations from time t501 to time t507 in FIG. 5. However, in this period, a period A in which the count values are integrated is shorter than set signal accumulation time. Accordingly, even if, at time t707, the COUNT becomes smaller than the threshold Cth and the PFREQ switches to the H level, only the output of the VCLK and the HCLK is stopped, and the integration memory area of the frame memory 206 is not read out.

Thereafter, if it is determined at time t708 that the COUNT is again greater than or equal to the threshold Cth, integration of the count values is resumed. In the period from time t707 to time t708, the output frequency of the pulse signal PLS is low, and this period corresponds to a period in which the flickering light brightness is low.

It is assumed that, with the PFREQ maintaining the L level from time t708, at time t709, the total of the unit periods in which the count values are integrated (the total of the period A and a period B) reaches the signal accumulation time. Accordingly, at time t710, the pulse frequency detection circuit 205 causes the TG 204 to stop supplying the VCLK to the vertical selection circuit 202 and supplying the HCLK to the horizontal selection circuit 203. Then, at time t711, the pulse frequency detection circuit 205 causes the TG 204 to start supplying the OUTCLK to the digital output circuit 208. Thus, image data held in the integration memory area of the frame memory 206 is output from the digital output circuit 208 to the outside of the image sensor 102, and the output is complete at time t712.

Operations from time t712 to time t715 are the same as the operations from time t513 to time t516 in FIG. 5.

Thus, even if the signal accumulation time is longer than the brightness change period of flickering light, image data can be acquired while suppressing the influence of flickering light by performing the operation to integrate the count values in periods in which the pulse frequency is high, over a plurality of brightness change periods.

Second Embodiment

Next, the second embodiment of the present invention will be described with reference to FIGS. 8 to 11.

Figure 8:
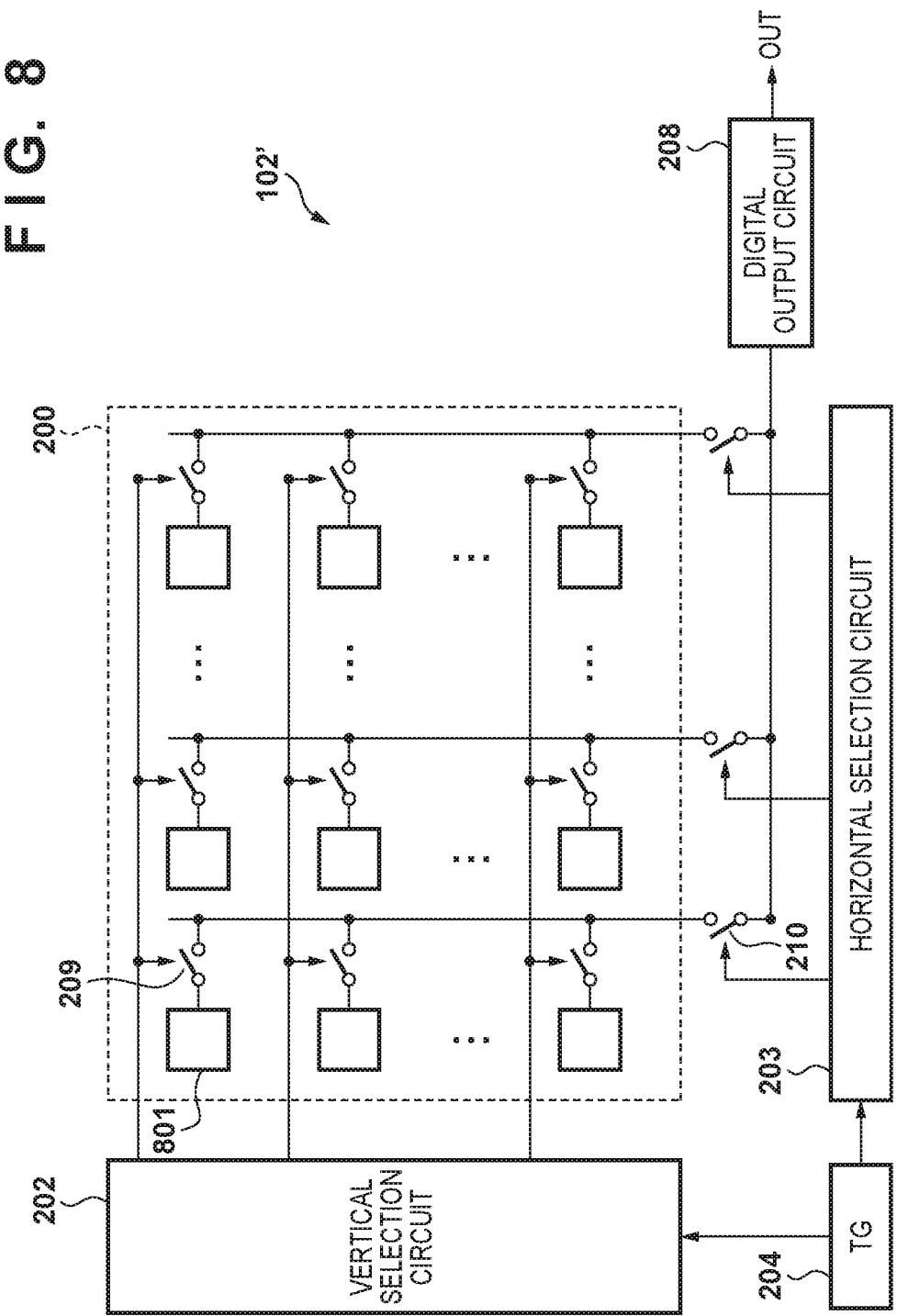
FIG. 8 shows an example configuration of an image sensor according to a second embodiment.
Figure 9:
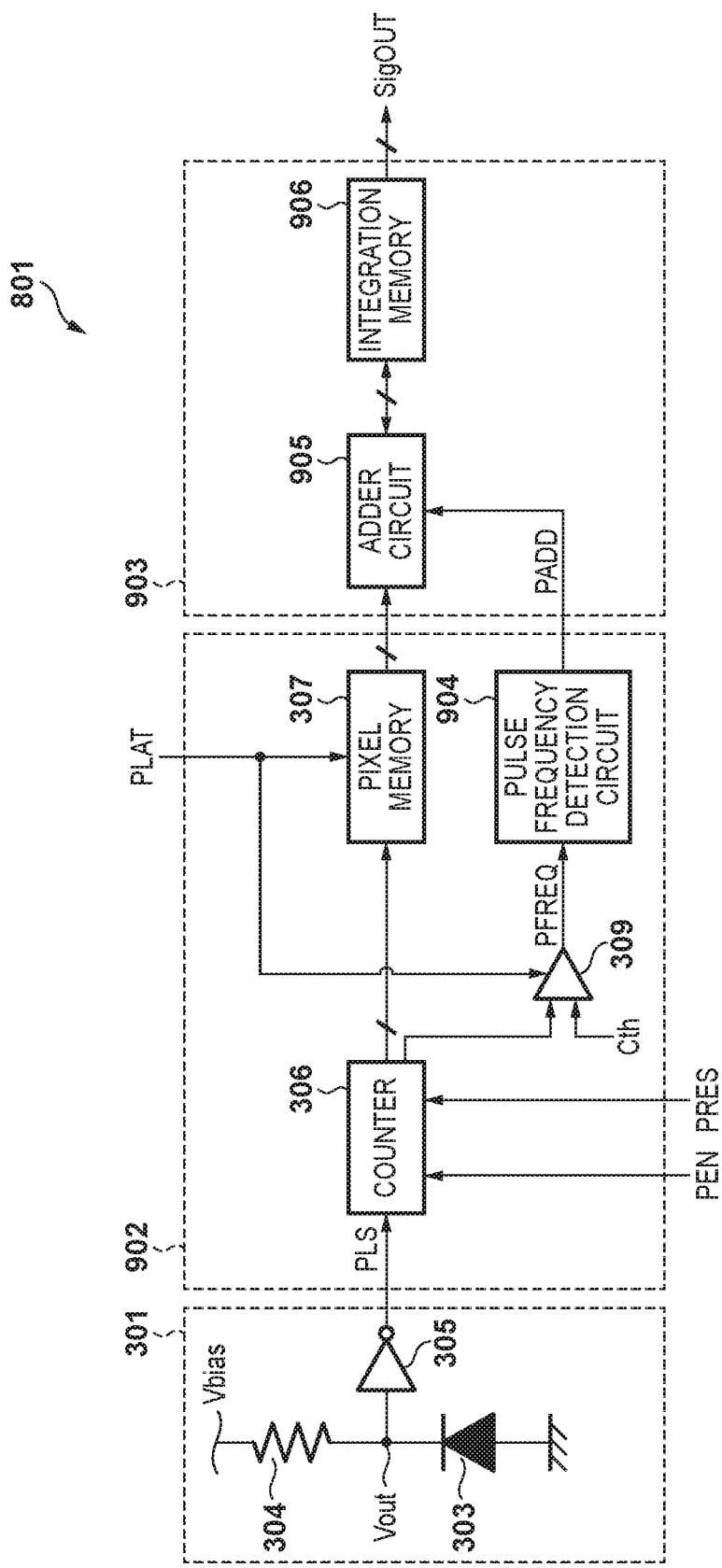
FIG. 9 shows an example circuit configuration of the image sensor according to the second embodiment.

FIG. 8 shows an overall configuration of an image sensor 102' according to this embodiment, and FIG. 9 shows a circuit diagram of a pixel 801 arranged in the image sensor 102'. In FIGS. 8 and 9, the same constituents as those of the image sensor 102 and the pixel 201 according to the first embodiment are assigned the same reference numerals as those in FIGS. 2 and 3, and descriptions thereof are omitted.

In this embodiment, a configuration is employed in which the pulse frequency detection circuit, the adder circuit, and the memory for holding an integrated count value (image data) according to the first embodiment are provided in each of the pixels.

Each of the pixels 801 has the light-receiving circuit 301, a counting circuit 902, and an integrating unit 903.

The integrating unit 903 has an adder circuit 905 and an integration memory 906. The adder circuit 905 and the integration memory 906 correspond to the adder circuit 207 and the integration memory area of the frame memory 206 in FIG. 2 respectively. The integration memory 906 can be provided with a sufficiently larger bit width than the bit width of the counter 306 and the pixel memory 307.

The counter 902 has the counter 306, the pixel memory 307, the comparator 309, and a pulse frequency detection circuit 904. The PFREQ output by the comparator 309 is supplied to the pulse frequency detection circuit 904. Note that, since the counting circuit 902 in this embodiment does not have the inverting buffer 308, the relationship between the values of the Cth and the count value and the level of the PFREQ is opposite to the relationship in the first embodiment. That is to say, in this embodiment, the PFREQ is at the H level when the count value is greater than or equal to the Cth, and the PFREQ is at the L level when the count value is smaller than the Cth.

If the PFREQ switches from the L level to the H level, the pulse frequency detection circuit 904 outputs an addition signal PADD to the adder circuit 905 (i.e. switches the addition signal PADD to the H level). Upon detecting the PADD, the adder circuit 905 adds the count value held in the pixel memory 307 and the count value held in the integration memory 906, and again stores the addition result in the integration memory 906. Thus, the count values counted during a unit period in which the PADD is output are integrated in the integration memory 906. The count value (image data) held in the integration memory 906 in each pixel is sequentially output to the digital output circuit 208 after the signal accumulation time has ended, by the vertical selection circuit 202 and the horizontal selection circuit 203. This operation is the same as that of the first embodiment, and a detailed description thereof is omitted accordingly.

Figure 10:
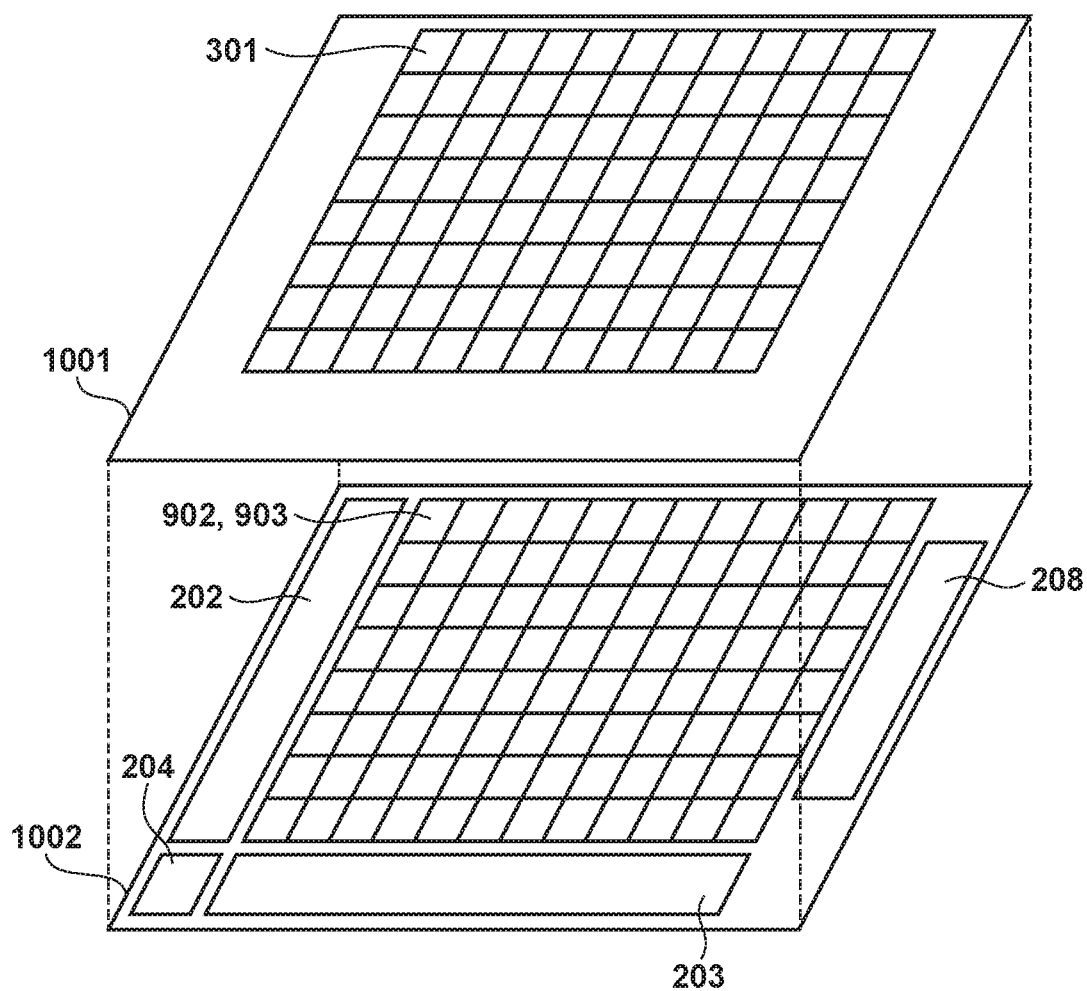
FIG. 10 shows an example of a chip layout of the image sensor according to the second embodiment.

FIG. 10 shows an example of a chip layout in the case where the image sensor 102' is realized by a stacked structure, and the same constituents as those of the first embodiment are assigned the same reference numerals as those in FIG. 4 and descriptions thereof are omitted. The image sensor 102' has a structure in which a light-receiving circuit substrate 1001 and a counting circuit substrate 1002 are stacked. The substrates are electrically connected to each other using silicon through electrodes or the like. In the light-receiving circuit substrate 1001, the light-receiving circuits 301 in the pixels 801 in the pixel area 200 are arranged in a matrix. In the counting circuit substrate 1002, the counting circuits 902 and the integrating units 903 in the pixels 801 are arranged in a matrix. Also, in the counting circuit substrate 1002, the vertical selection circuit 202, the horizontal selection circuit 203, the TG 204, and the digital output circuit 208 are arranged.

The light-receiving area in each pixel 801 can be increased by forming the light-receiving circuit 301 and the counting circuit 902 and integrating unit 903 thereof on separate substrates. Thus, a decrease in the aperture ratio of the light-receiving circuits can be prevented. Note that, instead of employing the stacked structure shown in FIG. 10, all of the circuits in the image sensor 102' may be formed on the same substrate.

Next, a signal accumulation and readout operation of the image sensor 102' according to this embodiment will be described with reference to the timing chart in FIG. 11. Note that the following description focuses on differences from the operation according to the first embodiment described with reference to FIG. 5, and common operations are described briefly.

Operations from time t1101 to t1105 are the same as the operations from time t501 to time t505 in FIG. 5. Note that, as mentioned above, the level of the PFREQ is opposite to that of the first embodiment.

Upon the count value COUNT reaching the threshold Cth at time t1105, the PFREQ of the representative pixel switches to the H level. Accordingly, the pulse frequency detection circuit 904 switches the addition signal PADD to the H level. Upon detecting that the PADD has switched to the H level, the adder circuit 905 performs addition processing to integrate the count values held in the pixel memory 307 with the count value held in the integration memory 906. Note that no count value is held (the value is 0) in the integration memory 906 when the first addition processing is performed from time t1105 to time t1106. For this reason, the count values read out from the pixel memory 307 may be simply held in the integration memory 906.

Since, in this embodiment, the pulse frequency detection circuit 904 is provided in each of the pixels, whether or not to integrate the count values is independently determined for each pixel, unlike the first embodiment. Accordingly, both pixels whose count values are integrated and pixels whose count values are not integrated may be present in each unit period.

The count value of the counter 306 is read out through the pixel memory 307 every unit period. Then the count values are integrated in the integration memory 906 every unit period in which the addition signal PADD is at the H level. The pulse frequency detection circuit 904 determines whether or not the total of the unit periods in which the count values were read out has reached the signal accumulation time. If it is determined that the total of the unit periods in which the count values were read out has reached the signal accumulation time, the pulse frequency detection circuit 904 switches the addition signal PADD to the L level regardless of the level of the PFREQ, and ends the addition processing. Also, the pulse frequency detection circuit 904 notifies the TG 204 that the addition processing has ended. Note that the PEN maintains the H level. Thus, the enabled state of the counter 306 in each pixel is maintained.

Figure 11:
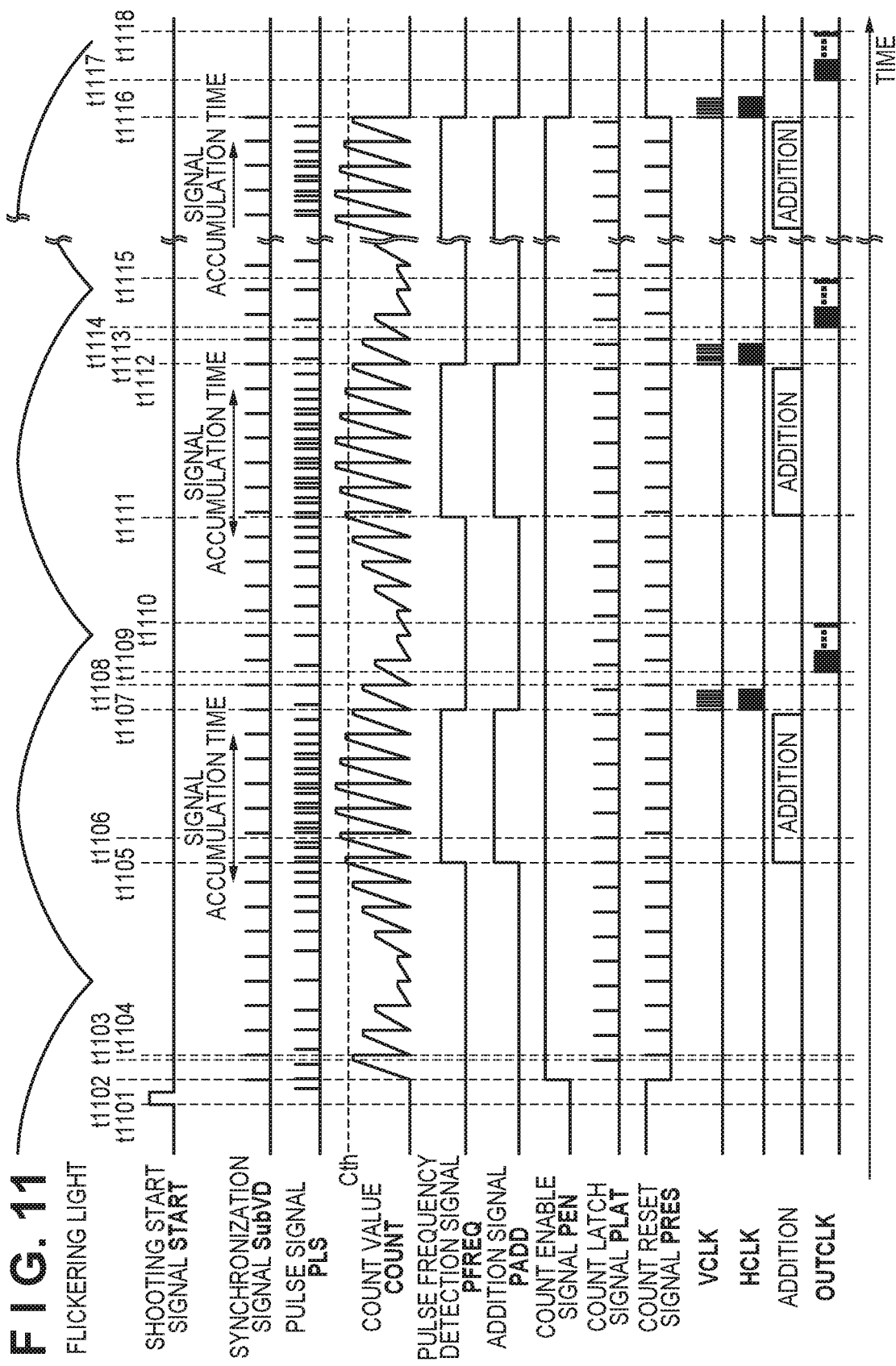
FIG. 11 is a timing chart relating to an operation of the image sensor according to the second embodiment.

The example in FIG. 11 also illustrates the case where the periods in which the PFREQ is at the H level are periods corresponding to the signal accumulation time, similarly to FIG. 5. In this case, the operation to read out the integrated count value (image data starts at time t1107 immediately after the PFREQ has switched to the L level. However, even if the PFREQ maintains the H level even after the signal accumulation time has elapsed, the operation to read out image data starts from time t1107.

The TG 204 monitors whether or not the pulse frequency detection circuit 904 in any of the pixels 801 in the pixel area 200 has notified the TG 204 of an end of the addition processing. If, at time t1107, the pulse frequency detection circuit 904 of the representative pixel has notified the TG 204 of an end of the addition processing, the TG 204 starts supplying the VCLK to the vertical selection circuit 202. Every time the VCLK switches to the H level, the switches 209 in each row sequentially turn on, and the vertical selection circuit 202 selects pixels in the pixel area row-by-row. Upon any one row being selected, the TG 204 supplies the HCLK to the horizontal selection circuit 203, and the switches 210 in each column sequentially turn on. Thus, the count values (image data) held in the integrating memories 906 in the pixels in the selected row are sequentially output to the digital output circuit 208.

Upon the time t1109 being reached, the TG 204 starts supplying the OUTCLK to the digital output circuit 208. Thus, image data for one frame is sequentially output to the outside of the image sensor 102. At time t1110, the output for one frame is complete.

Thereafter, upon the count value COUNT again reaching the threshold Cth at time t1111, the accumulation and readout for the second frame are executed through the same operations as those performed from time t1105 to time t1107.

Thereafter, frame image data is similarly acquired repeatedly until a signal for stopping or ending moving image shooting is detected. At time t1116, upon the signal accumulation time for the last frame elapsing, the PEN switches to the L level. Thus, the counter 306 in each pixel enters a disabled state, and the PLS input to the counter is no longer counted. The supply of the bias voltage Vbias to the light-receiving circuit 301 may also be stopped such that the light-receiving circuit 301 does not output the PLS. Then, the PRES switches to the H level, and the count value of the counter 306 is reset to 0. Here, the PFREQ also switches to the L level, and the addition signal PADD from the pulse frequency detection circuit 904 also switches to the L level. Thereafter, readout processing is performed from time t1117 to time t1118, and image data for the last frame is output.

Note that, in this embodiment as well, the same shooting sequence as that in the first embodiment (FIG. 6) can be carried out. Also, similarly to the first embodiment (FIG. 7), the signal accumulation time can be distributed to a plurality of brightness change periods. Also, the accumulation and readout operation in this embodiment can be performed in the single shooting mode.

In this embodiment as well, the same effects as those of the first embodiment can be achieved. Note that, in this embodiment, whether or not to integrate the count values is independently determined for each pixel, unlike the first embodiment. Accordingly, at the point in time when readout of image data is started, the count values in unit periods the number of which corresponds to the signal accumulation time are not necessarily integrated in all of the pixels. For this reason, when, for example, the adder circuit 905 stores image data in the integration memory 906 during the addition processing, information regarding the number of unit periods in which signal accumulation was performed (total signal accumulation time) can be associated with the image data. Thus, the difference in the signal accumulation time between pixels can be compensated using the information indicating the total signal accumulation time associated with each piece of image data read out from the image sensor 102'.

Third Embodiment

Next, the third embodiment of the present invention will be described with reference to FIGS. 12 and 13.

Note that this embodiment can be realized by the same constituents as those of the first embodiment except for the constituents of the image sensor, and a description of common constituents is omitted accordingly. Also, the signal accumulation and readout operation according to this embodiment may also be the same as that of the first embodiment, and a description of common operations is omitted accordingly.

The image sensor 102 according to the first embodiment has a configuration in which the PFREQ is input to the pulse frequency detection circuit 205 from each pixel row, whereas the same accumulation and readout operation is performed for all of the pixels in the pixel area 200. An image sensor 102″ according to this embodiment has a configuration in which the PFREQ is connected in common to each pixel block, which is constituted by n×m pixels (at least one of n and m is more than one) and is obtained by dividing the pixel area 200 into a plurality of blocks.

Whether or not flickering light is present is detected in each pixel block, and the signal accumulation and readout operation is controlled for each pixel block in accordance with the result of detecting flickering light. Accordingly, even if a plurality of types of flickering light sources with different period and/or phase of brightness change are present in a field of view, an image can be obtained while suppressing the influence of the flickering light sources.

Figure 12:
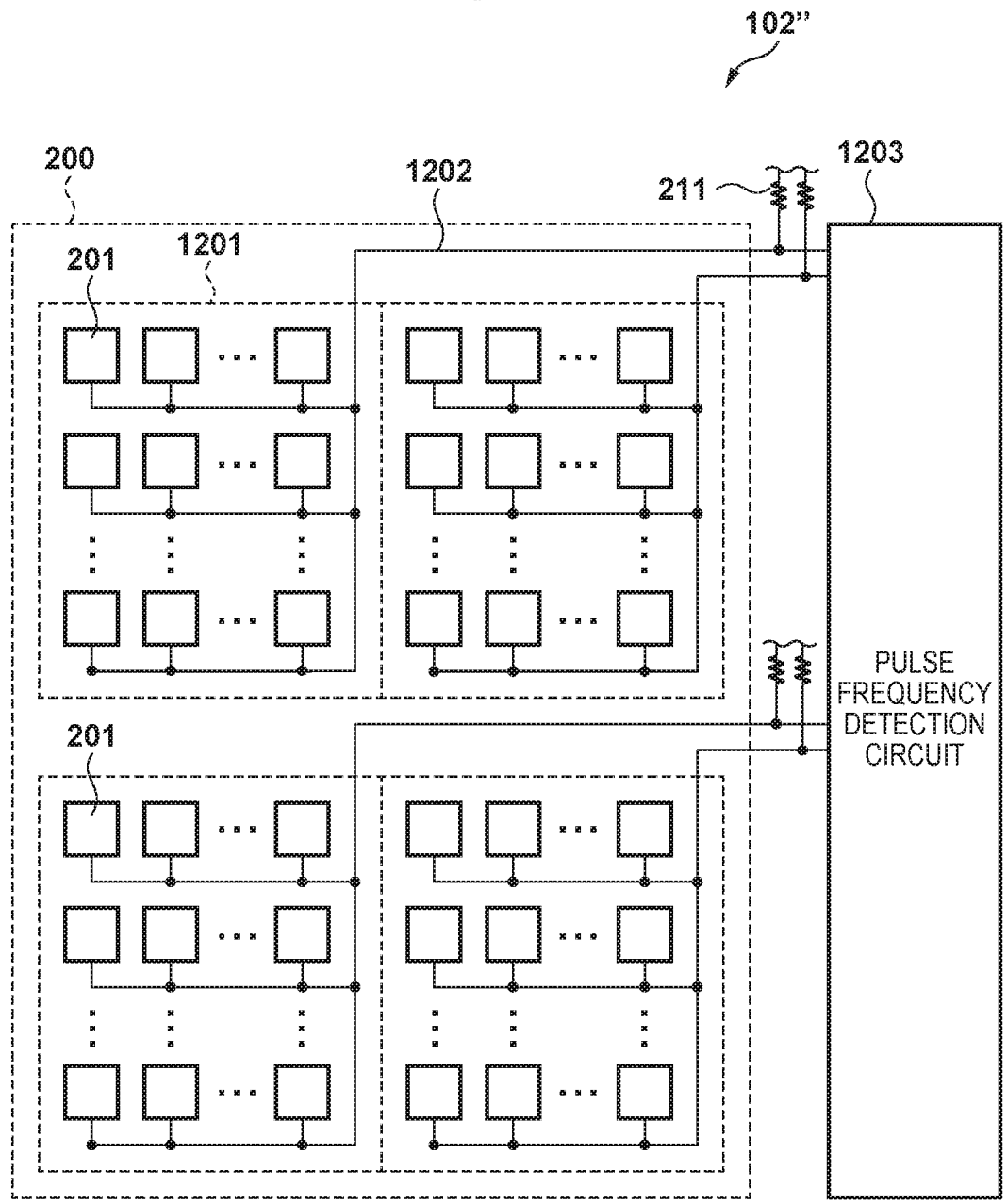
FIG. 12 shows an example configuration of an image sensor according to a third embodiment.

FIG. 12 shows a connection relationship between the pixel area 200 in the image sensor 102″ and a pulse frequency detection circuit 1203 according to this embodiment. The configuration except for the pixel area 200 and the pulse frequency detection circuit 1203 may be the same as that of the first embodiment shown in FIG. 2, and is omitted accordingly. To simplify the description, only some of the pixels (6×6 pixels) are shown in the pixel area 200. The configuration of the pixels 201 may be the same as that of the first embodiment (FIG. 3). Note that the sizes of the pixel blocks need not be equal to each other.

The PFREQs of a plurality of pixels 201 arranged in the pixel area 200 are connected, in units of the pixel block 1201, to the common interconnect 1202. The interconnects 1202 are connected separately from the respective pixel blocks 1201 to the pulse frequency detection circuit 1203.

The pulse frequency detection circuit 1203 detects whether or not flickering light is present, and brightness change characteristics (e.g. period or frequency) of the flickering light in each pixel block, based on the period of a change in the PFREQ level, for example. The pulse frequency detection circuit 1203 then sends a control signal to the TG 204 so as to perform the signal accumulation and readout operation described in the first embodiment, for example, for a pixel block for which it has been determined that flickering light is present. Also, the pulse frequency detection circuit 1203 sends a control signal to the TG 204 so as to perform the conventional accumulation and readout operation for a pixel block for which it has been determined that flickering light is not present.

Figure 13:
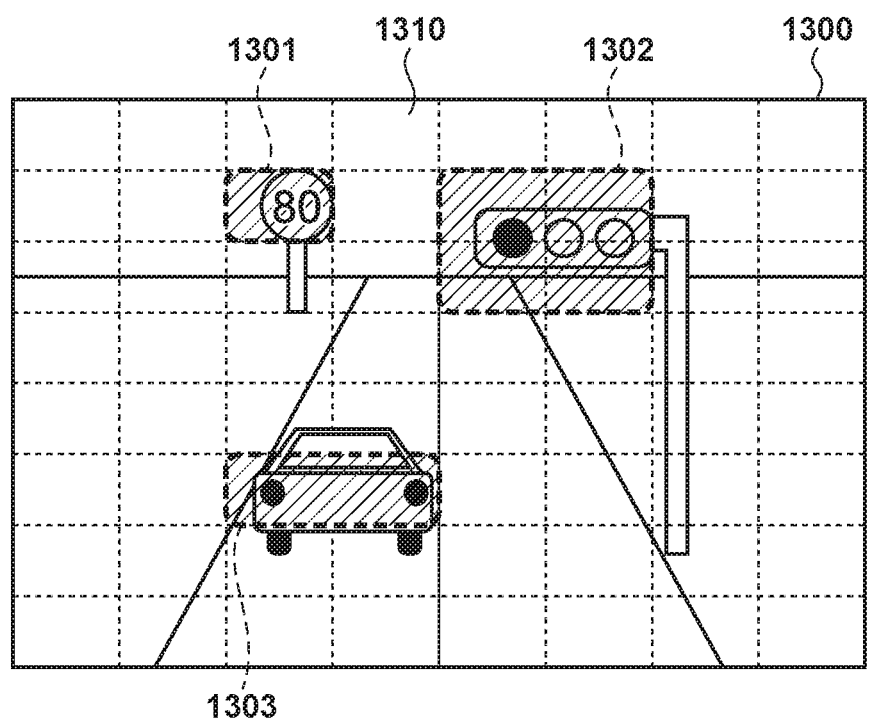
FIG. 13 illustrates an operation of the image sensor according to the third embodiment.

FIG. 13 shows an example of a field of view 1300 in which a plurality of types of flickering light sources are present. It is assumed that flickering light sources are present in a traffic sign, a traffic signal, and automobile lamps that are present in areas 1301 to 1303 of the field of view 1300, and the period and/or phase of brightness change characteristics differs therebetween.

Here, assuming that each unit area 1310 obtained by dividing the field of view 1300 corresponds to one pixel block, it is determined that flickering light is present for pixel blocks corresponding to the unit areas that constitutes the areas 1301 to 1303 It is also determined that flickering light is not present in the other pixel blocks. For example, whether or not flickering light is present is determined for each pixel block in step S603 in the shooting sequence described with reference to FIG. 6, and the processing can be advanced to step S604 if it is determined that flickering light is present, and can be advanced to step S606 if not.

Depending on the signal accumulation time, a situation may occur in which image data is read out before the number of unit periods in which the count values were actually integrated reaches the signal accumulation time in a pixel block for which it has been determined that flickering light is present. For this reason, at least for image data read out from a pixel block for which it has been determined that flickering light is present, the number of unit periods in which the count values are integrated can be associated with the image data and can be used to correct the data level during later processing, for example. Alternatively, integration of the count values may be continued until the number of unit periods in which the count values were integrated reaches the signal accumulation time for each pixel block.

According to this embodiment, whether or not flickering light is present is determined for each pixel block, and the accumulation and readout operation is controlled for each pixel block in accordance with the determination result. For this reason, even if different types of flickering light sources are present in a field of view, image data can be acquired while suppressing the influence of flickering light from the flickering light sources.

Other Embodiments

Embodiment(s) of the present invention can also be realized by a computer of a system or apparatus that reads out and executes computer executable instructions (e.g., one or more programs) recorded on a storage medium (which may also be referred to more fully as a 'non-transitory computer-readable storage medium') to perform the functions of one or more of the above-described embodiment(s) and/or that includes one or more circuits (e.g., application specific integrated circuit (ASIC)) for performing the functions of one or more of the above-described embodiment(s), and by a method performed by the computer of the system or apparatus by, for example, reading out and executing the computer executable instructions from the storage medium to perform the functions of one or more of the above-described embodiment(s) and/or controlling the one or more circuits to perform the functions of one or more of the above-described embodiment(s). The computer may comprise one or more processors (e.g., central processing unit (CPU), micro processing unit (MPU)) and may include a network of separate computers or separate processors to read out and execute the computer executable instructions. The computer executable instructions may be provided to the computer, for example, from a network or the storage medium. The storage medium may include, for example, one or more of a hard disk, a random-access memory (RAM), a read only memory (ROM), a storage of distributed computing systems, an optical disk (such as a compact disc (CD), digital versatile disc (DVD), or Blu-ray Disc (BD)™), a flash memory device, a memory card, and the like.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2019-018257, filed on Feb. 4, 2019, which is hereby incorporated by reference herein in its entirety.

What is claimed is:

1. An image capture apparatus comprising:
a pixel area in which pixels are two-dimensionally arranged, wherein each of the pixels has a light-receiving circuit that outputs a pulse signal in response to incidence of a photon and a counting circuit configured to count the pulse signal; and
a detection circuit that detects whether or not a flickering light source is present in a field of view, based on a period in which an output frequency of the pulse signal becomes greater than or equal to a predetermined threshold.

2. The image capture apparatus according to claim 1, wherein the output frequency of the pulse signal is a count value of the counting circuit per predetermined unit period.

3. An image capture apparatus comprising:
a pixel area in which pixels are two-dimensionally arranged, wherein each of the pixels has a light-receiving circuit configured to output a pulse signal in response to incidence of a photon and a counting circuit configured to count the pulse signal;
a memory that stores, for each of the pixels, an integrated value of a count value of the counting circuit; and
a control circuit that controls whether or not to integrate the count value of the counting circuit, based on an output frequency of the pulse signal.

4. The image capture apparatus according to claim 3, wherein the control circuit performs control so as to integrate the count value if the output frequency of the pulse signal is greater than or equal to a predetermined threshold, and so as to not integrate the count value if the output frequency of the pulse signal is smaller than the threshold.

5. The image capture apparatus according to claim 3, wherein, after starting integration of the count value, the control circuit performs control so as to integrate the count value regardless of the output frequency of the pulse signal until signal accumulation time is reached.

6. The image capture apparatus according to claim 3, wherein the control circuit starts integration of the count value for all of the pixels upon detecting a pixel whose the output frequency of the pulse signal is greater than or equal to a predetermined threshold, and ends the integration of the count value for all of the pixels if predetermined signal accumulation time is reached.

7. The image capture apparatus according to claim 3, wherein
the memory and the control circuit are provided for each of the pixels, and
the control circuit
integrates the count value if the count value in a predetermined unit period is greater than or equal to a predetermined threshold, and
ends the integration of the count value if the total of unit periods in which the count value is integrated reaches predetermined signal accumulation time.

8. The image capture apparatus according to claim 7, wherein the control circuit associates an integrated value to be stored in the memory with the number of unit periods in which the count value has been integrated.

9. The image capture apparatus according to claim 3, wherein
the pixel area is divided into a plurality of pixel blocks, and
the control circuit
detects, for each of the pixel blocks, whether or not a flickering light source is present in a field of view of the pixel block, based on an output frequency of the pulse signal,
performs control regarding whether or not to integrate the count value of the counting circuit, based on the output frequency of the pulse signal, for a pixel block in which presence of a flickering light source is detected, and
performs control regarding whether or not to integrate the count value of the counting circuit regardless of the output frequency of the pulse signal, for a pixel block in which presence of a flickering light source is not detected.

10. The image capture apparatus according to claim 9, wherein the control circuit associates an integrated value to be stored in the memory with the number of unit periods in which the count value is integrated, for a pixel block in which presence of a flickering light source is detected.

11. A method for controlling an image capture apparatus that has a pixel area in which pixels are two-dimensionally arranged, wherein each of the pixels has a light-receiving circuit configured to output a pulse signal in response to incidence of a photon and a counting circuit configured to count the pulse signal, the method comprising:
detecting whether or not a flickering light source is present in a field of view, based on a period in which an output frequency of the pulse signal becomes greater than or equal to a predetermined threshold.

12. A method for controlling an image capture apparatus that has: a pixel area in which pixels are two-dimensionally arranged, wherein each of the pixels has a light-receiving circuit configured to output a pulse signal in response to incidence of a photon, and a counting circuit configured to count the pulse signal; and a memory configured to store, for each of the pixels, an integrated value of a count value of the counting circuit, the method comprising:
performing control regarding whether or not to integrate the count value of the counting circuit, based on an output frequency of the pulse signal.

* * * * *